(12) United States Patent
Bennie et al.

(10) Patent No.: US 7,920,058 B2
(45) Date of Patent: Apr. 5, 2011

(54) TRAILER TIRE PRESSURE MONITORING SYSTEM

(75) Inventors: Brian Bennie, Sterling Heights, MI (US); Thomas Lee Miller, Ann Arbor, MI (US); Thomas Michael McQuade, Ann Arbor, MI (US); Ibrahim Issa, Schererville, IN (US); Karl Wojcik, Sterling Heights, MI (US)

(73) Assignee: Ford Global Technologies, Dearborn, MI (US)

( * ) Notice: Subject to any disclaimer, the term of this patent is extended or adjusted under 35 U.S.C. 154(b) by 351 days.

(21) Appl. No.: 12/265,093

(22) Filed: Nov. 5, 2008

(65) Prior Publication Data

US 2010/0109857 A1 May 6, 2010

(51) Int. Cl.
*B60C 23/00* (2006.01)
(52) U.S. Cl. .......... 340/480; 340/442; 340/447; 73/146; 73/146.5
(58) Field of Classification Search .................. 340/480, 340/438, 442, 443, 444, 445, 447; 73/146, 73/146.2, 146.5, 146.8
See application file for complete search history.

(56) References Cited

U.S. PATENT DOCUMENTS

| 6,246,317 | B1 * | 6/2001 | Pickornik et al. ............. 340/447 |
| 7,015,801 | B1 | 3/2006 | Juzswik |
| 7,196,618 | B2 | 3/2007 | Chen |
| 7,487,671 | B1 * | 2/2009 | Zhu et al. ..................... 73/146.5 |
| 7,541,916 | B2 * | 6/2009 | Choi et al. ............... 340/426.33 |
| 7,839,270 | B2 * | 11/2010 | Shimura ....................... 340/431 |
| 2002/0126005 | A1 | 9/2002 | Hardman et al. |
| 2003/0061873 | A1 | 4/2003 | Lin |
| 2004/0178897 | A1 | 9/2004 | Fennel et al. |

* cited by examiner

*Primary Examiner* — Toan N Pham
(74) *Attorney, Agent, or Firm* — Angela M. Brunetti; Fredrick Owens

(57) ABSTRACT

A system and method that, upon connection of a trailer to a tow vehicle, a trailer brake controller informs a tire pressure monitoring system to begin monitoring information at the TPMS and at the same time, activates the initiators, i.e., the electromagnets. Sensors respond to the electromagnetic field that is generated by electric brake magnets. As a result, the sensors transmit RF signals that are received by the tire pressure monitoring system. Transmissions from the sensors are decoded in a controller and processed as necessary for tire pressure monitoring automatically calibrated to the tire pressure monitoring system and the system can request the pressure data from the sensors by way of the low frequency field generated by the electric brakes.

8 Claims, 1 Drawing Sheet

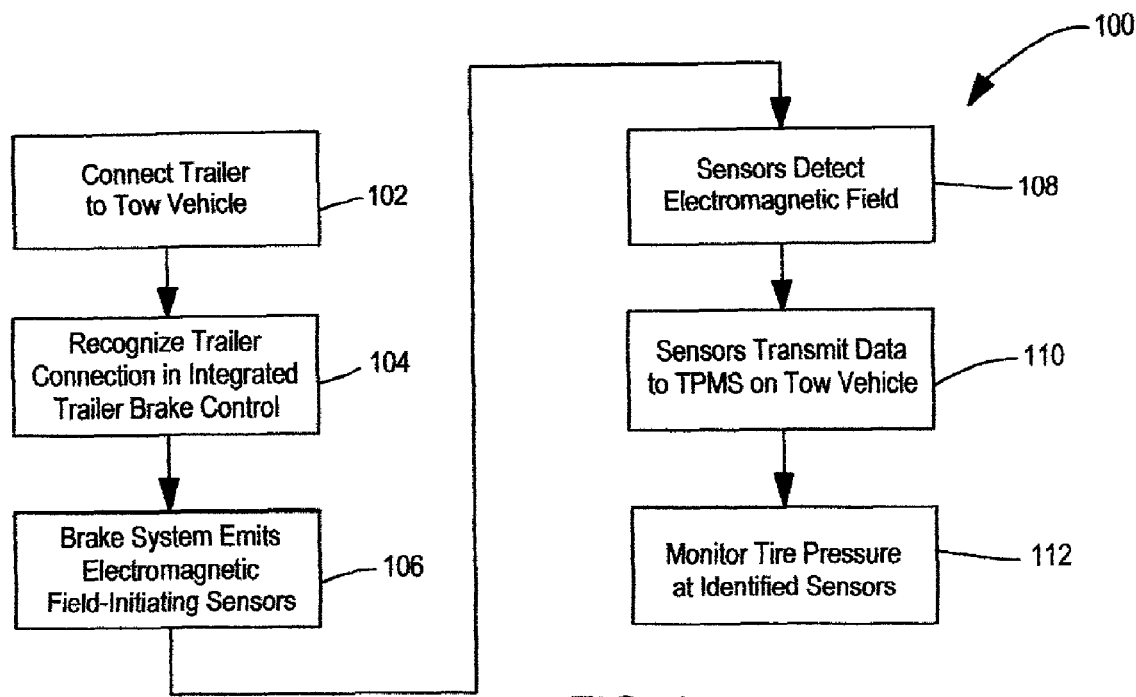
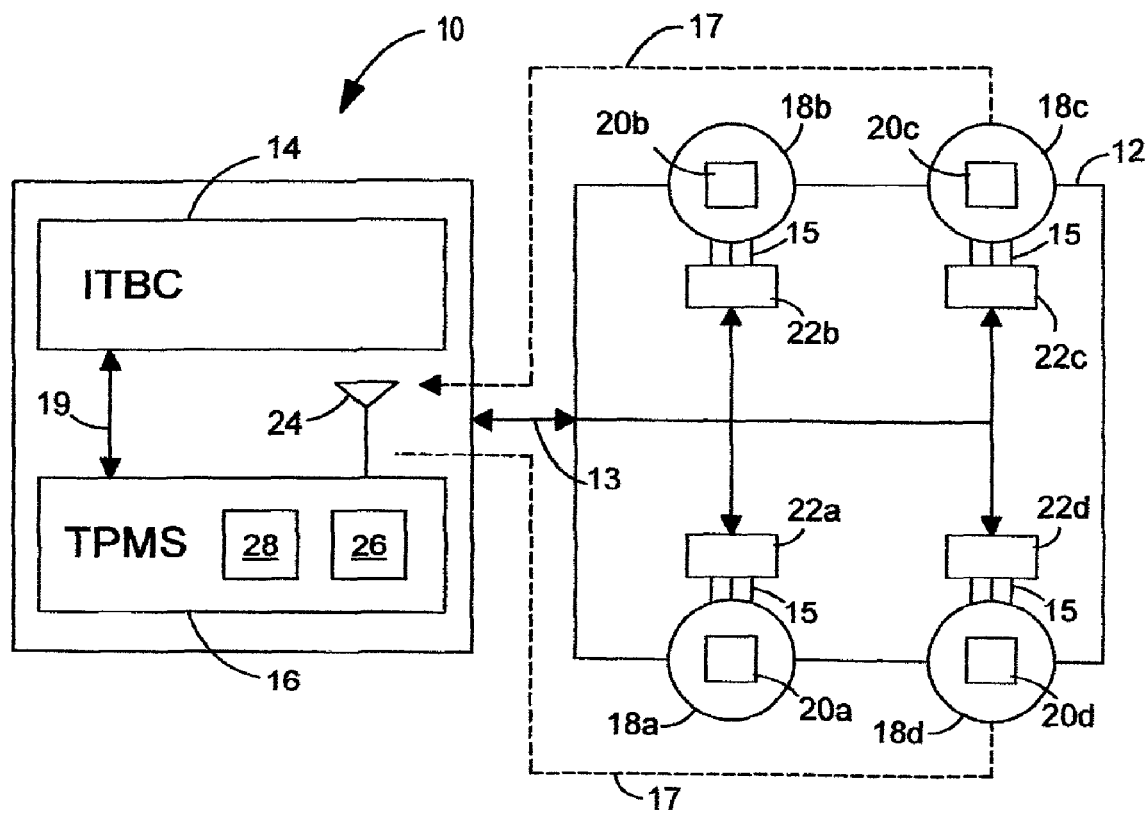

US 7,920,058 B2

TRAILER TIRE PRESSURE MONITORING SYSTEM

TECHNICAL FIELD

The present invention relates to monitoring tire pressure and more particularly to monitoring tire pressure for a trailer.

BACKGROUND

Various types of pressure sensing systems for monitoring the pressure within the tires of an automotive vehicle have been proposed. Such systems generate a pressure signal using an electromagnetic signal, which is transmitted to a receiver. The pressure signal corresponds to the pressure within the tire. When the pressure drops below a predetermined pressure, an indicator is used to signal the vehicle operator of the low pressure.

Sport utility vehicles and other large vehicles are often used to pull a trailer. It is desirable to monitor the condition of the trailer tires as well as the primary vehicle tires. A drawback associated with known methods is that driver intervention is required in order to properly configure the system. The driver is required to calibrate an RF receiver with the associated sensors mounted in the tires of the trailer. Furthermore, the relevancy of the pressure data is dependent on the transmit rate of the sensors, which is typically operated at a reduced rate, while stationary, in order to optimize the battery life of the sensors. The result is unknown pressure at initial trailer connect.

In an attempt to overcome this problem, some systems have incorporated low frequency initiators to excite the sensors, thereby allowing the system to self-calibrate and request pressure data. The initiators, as a separate component, are placed in the wheel wells of a vehicle and initiate a signal to the sensor in a tire. The sensor, excited by the initiators, transmits identification data and other information to the receiver. However, this adds unwanted cost and complexity to the system.

There is a need for a tire pressure monitoring system for a trailer that does not require manual intervention by a driver, does not result in delayed pressure data, and does not increase the cost and complexity of the system.

SUMMARY

The present invention provides a system and method for automatically monitoring the tire pressure in trailer tires comprising the combination of features of the independent claims, preferred optional features being introduced by the dependent claims.

DESCRIPTION OF DRAWINGS

FIG. 1 is a block diagram of a method of the inventive subject matter; and

FIG. 2 is a block diagram of a system for pressure monitoring of the inventive subject matter.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention. In the figures, like reference numbers will be used to illustrate the same components. Those skilled in the art will recognize that the various components set forth herein may be altered without varying from the scope of the inventive subject matter. The inventive subject matter is described herein in conjunction with a trailer and a tow vehicle equipped with integrated trailer brake control as described in U.S. Pat. No. 6,966,613, incorporated herein by reference, and a tire pressure monitoring system as described in U.S. Pat. No. 7,026,922, incorporated herein by reference. However, it should be noted that the inventive subject matter may be practiced with a trailer brake control that is not integrated, such as an aftermarket trailer brake controller, without departing from the scope of the inventive subject matter.

According to the inventive subject matter, a method is presented in a block diagram 100 shown in FIG. 1. According to the method 100, a trailer is connected 102 to a tow vehicle. The tow vehicle is equipped with integrated trailer brake control and a tire pressure monitoring system. When the trailer is initially connected, the tow vehicle's integrated trailer brake controller recognizes 104 that the trailer has been connected and initiates sensors on the trailer to provide identification to the trailer brake controller. According to the inventive subject matter, electromagnets on trailer's braking system are utilized in initiating the sensors. Upon detection of the trailer connection, the integrated trailer brake controller sends a signal to the electromagnets. The electromagnets emit a field 106 that may be detected 108 by the sensor within a tire cavity. The electromagnet is essentially acting as an initiator for the tire pressure sensor, thereby eliminating the need for a separate component to initiate the sensor. Once the electromagnetic field emitted by the trailer brake magnet is detected 108 by the sensor, the sensor will transmit 110 a signal containing its information to a tire pressure monitoring system in the tow vehicle. The tire pressure monitoring system detects, identifies and calibrates the sensor to its respective tire location and stores the information in memory, to be described in detail later herein. Thereafter, the tire pressure monitoring system is capable of monitoring 112 the tire pressure at each sensor location.

FIG. 2 shows a tire pressure monitoring system 10 of the inventive subject matter for monitoring the air pressure in a trailer's tires. The inventive subject matter is directed to a trailer 12, which is preferably connected to an automotive vehicle, also referred to as a tow vehicle (not shown). The trailer 12 is in communication with various vehicle systems, including an integrated trailer brake controller 14 on the tow vehicle, and a tire pressure monitoring system 16, also on the tow vehicle. Communication between the trailer and the integrated trailer brake controller may be through hard wired connections 13 as well as low frequency (LF) 15 and radio frequency (RF) transmissions, 17. In the present example, the trailer 12 has four tires 18. A left front tire, 18a, a right front tire, 18b, a right rear tire, 18c, and a left rear tire 18d are shown. It should be noted that while a four-tire arrangement is shown, it is possible that the trailer may have more, or fewer, tires. One skilled in the art is capable of applying the inventive subject matter described herein to a trailer having a different number of tires than the example detailed herein.

Each tire 18 is positioned upon a corresponding wheel on the trailer 12. Each tire has a respective tire pressure sensor circuit 20a, 20b, 20c, and 20d and an electromagnet 22a, 22b, 22c, and 22d that are part of the trailer's electric brake system, and are situated within the trailer's brakes. Each electromagnet is positioned adjacent to the tire and constitutes an initiator for each sensor 20. The initiators 22 generate low frequency RF signals 15 recognized by and initiating a response from each sensor 20a-20d so that the position of each sensor 20a-20d may be recognized by the pressure monitoring system 10 on the vehicle. The initiators 22, which are part of the trailer's electric brakes, are coupled to the integrated trailer brake controller 14 on the tow vehicle. An antenna 24 on the pressure monitoring system 10 receives signals sent by the sensors 20a-20d once they activated by the initiators 22a-22d.

According to the inventive subject matter, the initiators 22 are the electric brake magnets that are part of the trailer's electric brake system. The magnets act as initiators when not being utilized for braking. The integrated brake controller 14, upon detection connectivity of the trailer 12 to the tow vehicle, will send a signal 13 to the electric brake magnets, which emit the low frequency electromagnetic signal 15 to excite the sensors 20 as needed, or requested, by the tire pressure monitoring system 16. The integrated trailer brake controller 14 automatically recognizes the connection of the trailer 12 to the towing vehicle.

When the trailer is connected, the integrated trailer brake controller informs the tire pressure monitoring system to begin monitoring information at the TPMS and at the same time, activates the initiators, i.e., the electromagnets. The sensors 20a-20d respond to the electromagnetic field that is generated from the signal to the electric brake magnets 22a-22d. As a result, the sensors transmit RF signals 17 that are received by the antenna 24. The antenna 24 is coupled to a receiver 26 in the tire pressure monitoring system. A controller 28 is coupled to the receiver 26 which has an antenna 24 associated therewith. Receiver 26 receives pressure information and other information from the tire pressure sensors 20a, 20b, 20c, and 20d to be processed by controller 26. Transmissions from the sensors 20a-20d are decoded in the controller 28 and processed as necessary for tire pressure monitoring automatically calibrated to the tire pressure monitoring system 10 and the system 10 can request the pressure data from the sensors 16 by way of the low frequency field generated by the electric brakes.

An advantage of the inventive subject matter is that no additional hardware is necessary, which results in no added cost. The system is self calibrating, in that no operator/driver input is required.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A method of operating a tire pressure monitoring system for a trailer comprising the steps of:
    connecting the trailer to a tow vehicle having a trailer brake controller and a tire pressure monitoring system;
    activating electromagnets on the trailer brakes to generate an electromagnetic field upon recognition of the trailer being connected to the tow vehicle by the trailer brake controller;
    exciting tire pressure sensors on the trailer in response to the electromagnetic field;
    transmitting a signal from the sensors on the trailer to the tire pressure monitoring system on the tow vehicle, the signal comprises a sensor identification;
    identifying the tire pressure sensors at the tire pressure monitoring system on the tow vehicle based on the transmitted sensor identification; and
    monitoring the tire pressure at the identified tire pressure sensors.

2. The method as claimed in claim 1 further comprising the steps of:
    detecting when a sensor stops transmitting; and
    notifying an operator of a potential sensor failure.

3. A system for initiating a tire pressure monitoring system for a trailer having electric brakes, the system comprising:
    a tire pressure monitoring system on a tow vehicle;
    a trailer brake controller on the tow vehicle;
    a plurality of electromagnets fixedly attached to the trailer brakes in a respective plurality of locations on the trailer, whereby the plurality of electromagnets generate an electromagnetic field upon recognition and activation by the trailer brake controller;
    a plurality of pressure sensors attached to the trailer wheels for transmitting a respective plurality of identification signals to the tire pressure monitoring system upon excitation by the electromagnetic field generated by the plurality of electromagnets; and
    wherein the tire pressure monitoring system identifies the plurality of pressure sensors and monitors a tire pressure at each identified sensor location.

4. The method as claimed in claim 3 further comprising the steps of transmitting a signal representative of an indication that no sensor identifications have been detected in the transmitted signals.

5. The method as claimed in claim 3 further comprising the steps of:
    detecting when a sensor stops transmitting; and
    generating a signal notifying an operator of a potential sensor failure.

6. A method of monitoring tire pressure on a trailer having a trailer brake controller, the method comprising the steps of:
- recognizing the connection of the trailer to the tow vehicle in the trailer brake controller;
- sending an initiator signal from the trailer brake controller to the trailer brakes thereby generating an electromagnetic field in magnets on the trailer brakes;
- exciting tire pressure sensors on the trailer in response to the electromagnetic field;
- transmitting a sensor identification signal from the sensors on the trailer to a tire pressure monitoring system;
- identifying the sensors on the trailer in the tire pressure monitoring system based on the sensor identification signal; and
- monitoring a tire pressure at each location associated with an identified sensor on the trailer in the tire pressure monitoring system.

7. The method as claimed in claim 6 further comprising the steps of transmitting a signal representative of an indication that no sensor identifications have been detected in the transmitted signals.

8. The method as claimed in claim 6 further comprising the steps of:
- detecting when a sensor stops transmitting; and
- generating a signal notifying an operator of a potential sensor failure.

* * * * *